(12) United States Patent
Goebel et al.

(10) Patent No.: US 9,880,759 B2
(45) Date of Patent: *Jan. 30, 2018

(54) METADATA FOR DATA STORAGE ARRAY

(71) Applicant: Microsoft Technology Licensing, LLC, Redmond, WA (US)

(72) Inventors: David A. Goebel, Vashon, WA (US); James M. Lyon, Redmond, WA (US); Bulat Shelepov, Bellevue, WA (US); Robert S. Kleinschmidt, Redmond, WA (US); Mark Vayman, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 62 days.

This patent is subject to a terminal disclaimer.

(21) Appl. No.: 14/715,524

(22) Filed: May 18, 2015

(65) Prior Publication Data
US 2015/0301758 A1  Oct. 22, 2015

Related U.S. Application Data

(63) Continuation of application No. 12/432,877, filed on Apr. 30, 2009, now Pat. No. 9,037,541.

(51) Int. Cl.
| | |
|---|---|
| *G06F 7/00* | (2006.01) |
| *G06F 3/06* | (2006.01) |
| *G06F 17/30* | (2006.01) |
| *G06F 11/20* | (2006.01) |

(52) U.S. Cl.
CPC .......... *G06F 3/0619* (2013.01); *G06F 3/0665* (2013.01); *G06F 3/0689* (2013.01); *G06F 11/2094* (2013.01); *G06F 17/30082* (2013.01); *G06F 11/2058* (2013.01); *G06F 11/2087* (2013.01); *G06F 2003/0692* (2013.01)

(58) Field of Classification Search
None
See application file for complete search history.

(56) References Cited

U.S. PATENT DOCUMENTS

| | | | | |
|---|---|---|---|---|
| 2004/0199566 | A1* | 10/2004 | Carlson | G06F 17/30067 709/201 |
| 2007/0244939 | A1* | 10/2007 | Devarakonda | G06F 17/30315 |
| 2009/0164750 | A1* | 6/2009 | Atri | G06F 11/141 711/209 |

* cited by examiner

*Primary Examiner* — Thu Nga Nguyen
(74) *Attorney, Agent, or Firm* — Mcihael B. Dodd; Dodd Law Group

(57) ABSTRACT

A data storage array may be made up of several storage devices, each of which may contain array metadata that may allow portions of the storage array to be used. A system may have a file system manager that may receive and respond to file system commands and a storage device manager that may store data on the several storage devices. Array metadata defining where data is stored within the storage array is stored on each device within the array. A policy engine may identify data to be stored on the array and determine if the data contains array metadata or other types of data and may store the data on every device, devices having specific characteristics, two or more devices, or one device.

20 Claims, 4 Drawing Sheets

METADATA FOR DATA STORAGE ARRAY

CROSS REFERENCE TO RELATED APPLICATIONS

This application is a continuation of and claims the benefit of and priority to U.S. patent application Ser. No. 12/432,877 entitled "Metadata for Data Storage Array", filed Apr. 30, 2009 by David A. Goebel et al., the entire contents of which are expressly incorporated by reference.

BACKGROUND

Data storage systems are used to store large amounts of data. Some examples are various Redundant Array of Independent Disks or RAID systems. RAID systems incorporate two or more hard disk storage devices in different configurations to optimize speed by 'striping' or redundancy by creating parity blocks from XOR'ing several blocks together. Many RAID systems can tolerate one and sometimes two disks to fail while retaining all of the data on the system. If more than a specific number of disks fail, then none of the data on the system can be recovered.

SUMMARY

A data storage array may be made up of several storage devices, each of which may contain array metadata that may allow portions of the storage array to be used. A system may have a file system manager that may receive and respond to file system commands and a storage device manager that may store data on the several storage devices. Array metadata defining where data is stored within the storage array is stored on each device within the array. A policy engine may identify data to be stored on the array and determine if the data contains array metadata or other types of data and may store the data on every device, devices having specific characteristics, two or more devices, or one device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
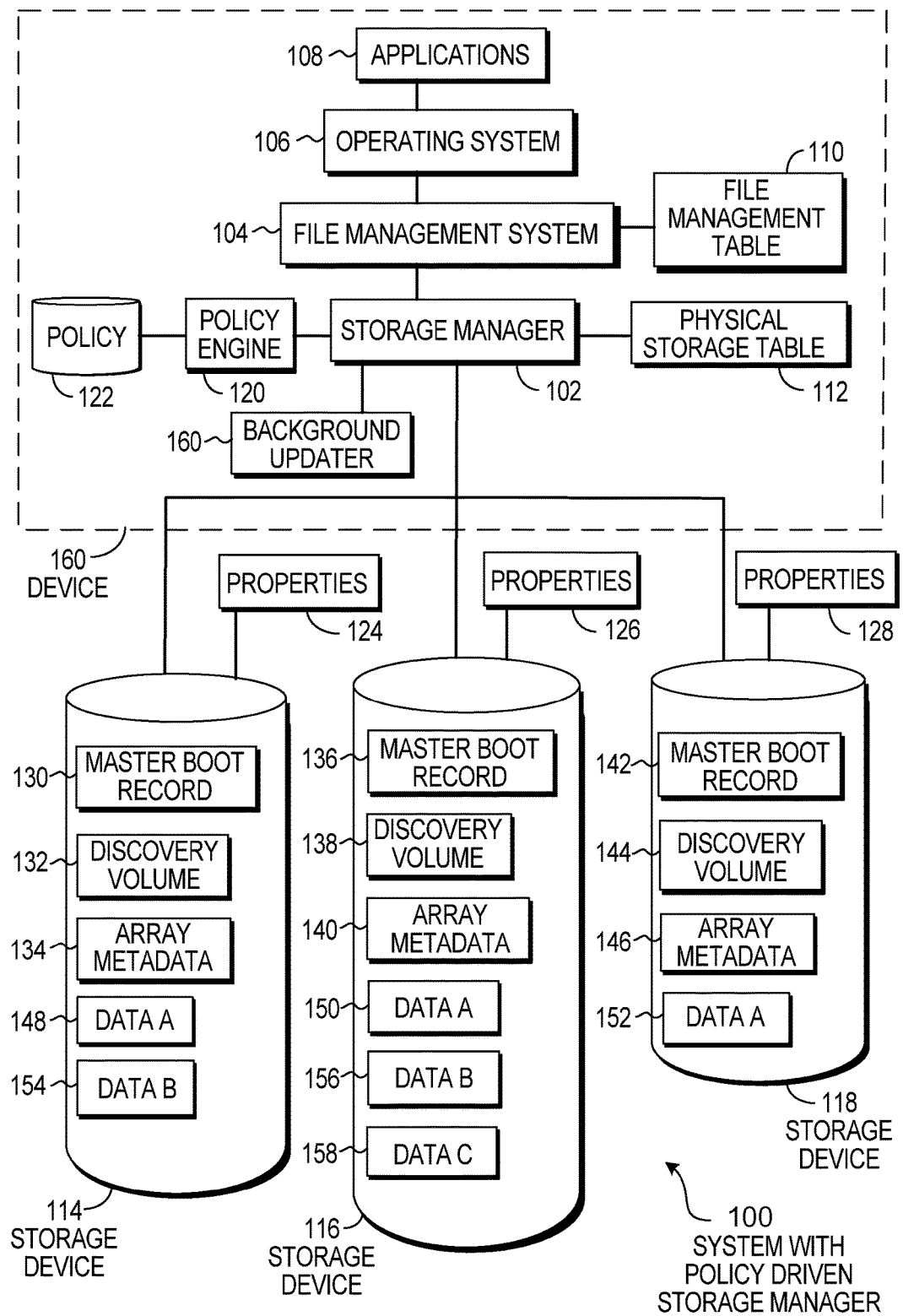
FIG. 1 is a diagram illustration of an embodiment showing a system with a policy driven storage manager.

A data storage array may manage several storage devices, each of which may store metadata for the entire array of devices. The metadata may include storage tables that may map virtual storage blocks as manipulated by a file management system to physical storage blocks managed by a storage manager. The metadata may be stored on every device in the array so that no matter how many devices are removed due to failure or other mishap, the data that are stored on the remaining device or devices may be recovered.

The data storage array may use a policy mechanism to determine if certain types of data are to be stored on every storage device. Such a policy may be applied to array metadata as well as other high value or sensitive data. Other policies may define data types that are to be stored on two storage devices, providing redundancy in case of failure of one device. Still other policies may define a preference for certain types of storage devices for certain types of data.

A file management system may use a file management table to keep track of blocks of storage and the contents of those blocks. The blocks of storage may be virtual blocks, and may correspond to physical blocks in a physical block table managed by the storage manager.

The storage manager may apply policies to blocks of data. Data stored in a block of data may all have the same policy applied. When a set of data is written to a block and the policies of the newly written data do not match the existing policies applied to the block, the newly written data may be moved to another block with the proper policy.

In some implementations, a background process may apply policies by performing duplication and other updates to the data after the initial data are written.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, resources, data structures, etc. that perform particular tasks or implement particular abstract data types. Typically, the functionality of the program modules may be combined or distributed as desired in various embodiments.

FIG. 1 is a diagram of an embodiment 100 showing a system with a policy driven storage manager. Embodiment 100 is a simplified example of a stack of functional components that may perform various storage functions for data by storing data on an array of storage devices. Different data may be stored differently on the storage array based on the policy applied to metadata concerning the data.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates the functional components of a system that may be implemented in any hardware arrangement that has multiple storage devices. The storage devices may be the same capacity and may use the same type of connection interface. The storage devices may, in some embodiments, have different storage capacities and may use different connection interfaces. In some embodiments, two storage devices may be managed, while in other embodiments tens, hundreds, or more storage devices may be managed.

Embodiment 100 illustrates a storage system that may be implemented in a single computer device to manage several storage devices connected to the computer. Data may be stored on the storage devices in different manners according to policies defined for those data. Metadata associated with the data may be used to determine how the data are to be stored.

The storage system of embodiments 100 may be deployed on a conventional desktop or server computer. In a typical embodiment, a server computer or desktop computer may provide the functions of embodiment 100. Some embodiments may be deployed in any type of device that may have one or more storage devices. For example, a handheld cellular telephone may contain an internal solid state memory device and a removable memory device, on which the functionality of embodiment 100 may be deployed.

The example of embodiment 100 may be operated on a device 160. The device 160 may be a hardware platform having a processor that may be execute instructions in the form of software. The software may define the functional components, data structures, and other elements of embodiment 100.

A storage manager 102 may manage multiple storage devices, and a file management system 104 may present a file command interface to an operating system 106 which may in turn host various applications 108. When a file command such as a read or write command is issued by an application 108, the command may be passed to the operating system 106. The operating system 106 may pass the command to a file management system 104. The file management system 104 may be an operating system component in some embodiments.

The file management system 104 may expose a file system to the operating system 106. The file system exposed may be a file system that uses the combined storage capacity of several different storage devices and may not represent the classic file storage system that may have been tied to a single hard disk or other storage media.

The file management system 104 may track the location of files within the storage devices through a file management table 110. The file management table 110 may track many blocks of data and the files stored on those blocks. In many embodiments, the blocks of data may be storage areas of the same capacity. Each block may contain several smaller files, and in some cases, larger files may span several blocks.

A file management table may include the location of specific files within the file system in the virtual volume. A file management table may include many different forms of metadata concerning a file. The metadata may include information such as security settings, file type, file owner, file size, extents, and other metadata. In some embodiments, a file management table may include a bitmap or other representation of blocks of data that are either free or occupied.

In this specification and claims, the term "block" is used to represent a generic unit of storage space, and may or may not correspond with a particular physical feature or capacity of a specific physical storage device. The term "block" is used only in the generic sense as a unit of storage and is not meant to be limiting in any manner. In some embodiments, the unit represented by a block may be a sector of 512 bytes, a cluster containing one or more sectors, or some other unit of storage. Different embodiments may manage storage using various sized units of storage. In cases where many small files are managed, a smaller sized block of storage may be used. In cases where very large files are managed, a larger sized block of storage may be used.

In a typical embodiment for a common personal computer operating system, a block of data may be approximately one gigabyte in size. Other embodiments may be block sizes that are larger or smaller, depending on the data storage devices, the typical file size, and other factors.

The term "file management table" is used to describe a metadata system or database that may be used to manage a file system. In a simple embodiment, a file management table may be a table or array of files located in a volume along with the starting location of the file within the volume. In more complex embodiments, the file management table may be a relational database or other data storage mechanism that may comprise several tables or other mechanism for storing data concerning the file system. Some file management tables may include a bitmap that represent the storage blocks within a volume, where the bits within bitmap may represent whether or not a block is used or free.

The blocks of data managed in the file management table 110 may correspond to blocks of physical storage in a physical storage table 112 managed by a storage manager 102. The physical storage table 112 may map a virtual block of data as defined by the file management system to a physical block of data located on one or more of the storage devices 114, 116, and 118.

The physical storage table may be any type of database that may be used to manage the physical devices. The physical storage table may contain, among other things, addresses for physical blocks of data that represent the virtual blocks of data managed by the file management system 102 and stored in a file management table. The physical storage table may be represented as a table, an array, a relational database, a log file, or any other database construct.

When a request for data comes from the file management system 104, a reference for a virtual block of data may accompany the request. A storage manager 102 may look up the physical block location using the virtual block location and may then read or write data to that physical block. A physical block location may include a designator for a specific device and an address or identifier for a location of the block on the device.

The storage manager 102 may store data on the devices 114, 116, and 118 in different manners depending on a policy. A policy engine 120 may determine a particular policy to apply from a policy database 122. The policy may be applied by analyzing metadata associated with the underlying data.

Policies may define how certain data are to be handled. In one example, a policy may dictate that certain data are to be duplicated on two or more storage devices. Another example may be a policy that stores certain data, such as file management table 110 metadata, on every device within an array.

Other policies may cause certain data to be placed on specific types of devices. For example, some data may be stored on high reliability devices. In order to determine which devices within the storage array are the most reliable, metrics for each device may be compared and the devices may be ranked. The device having the highest reliability metric may be selected. In another example, a device for storing a set of data may be selected from a set of devices that exceed a reliability threshold.

In some cases, some storage devices may have certain properties, such as removability or portability. For example, some arrays may include an optical disk with read/write capabilities or a solid state memory device such as a Universal Serial Port (USB) flash memory device. When such devices exist in a storage array, policies may define which data are to be stored on such devices. In many cases, a policy may define that data stored on such devices may also have a duplicate stored on another type of device such as a hard disk system. Another example of a policy may include putting data on one disk so that other disks can be spun down.

The metadata used by the policy engine 120 may be supplied by the file management system 104 or may be derived from the data by analysis. When the metadata is supplied by the file management system 104, the data may be sent to the storage manager 102 with attached metadata, such as extents, storage attributes, file type, directory location, sensitivity, designations for read only status, hidden status, archived status, compressed, encrypted, or other metadata.

For example, a policy engine 120 may receive a file to store along with an archived status as part of the metadata. The policy engine 120 may apply a policy that states that archived files may be stored on slower performing devices, as archives files are less likely to be used often.

Derived metadata may be determined by analyzing the data to be stored. In some cases, a file may have attributes that can be extracted from analyzing the data. When a file is found to contain a certain type of data, an appropriate policy may be applied.

In many embodiments, policies may be applied to sections of a hierarchical file structure. For example, a subdirectory may be designated with certain file storage attributes, such as an attribute that may be used by a policy engine 120 to cause data to be duplicated on several storage devices. Files that may be located in the subdirectory structure may have the attribute applied in the file metadata and may be treated similarly by the policy engine 120.

The storage manager 102 may create array metadata that may define how the storage array is configured and where certain data is located on the storage array. A portion of the array metadata may include the physical storage table 112 and, in some embodiments, the persisted version of the file management table 110.

When data is received that is part of the array metadata, a policy may define that all array metadata is duplicated on each storage device in an array. By placing all of the array metadata on each storage device, the data on any storage device may be recovered if that storage device is accessed using a storage manager 102 and file management system 104. An example of such a recovery is given in embodiment 400 presented later in this specification.

In many embodiments, policies may be applied on a block by block basis. All of the data stored in a block may have the same policy applied. By applying policies to blocks of data rather than individual files, the management of the storage devices may be simplified.

For example, some embodiments may have a background updater 160 that may perform various operations in a non-real time or background manner. If a block on one storage device is designated as a duplicate of another block on another storage device, the background updater 160 may synchronize both blocks as a background process. In such an embodiment, the storage manager 102 may place a file in a block on one storage device where the block is designated for duplication. The block or file may be marked as unprocessed, and the background updater 160 may recognize the marked block or file and perform a background process of duplicating the block or file to another storage device.

The storage manager 102 may monitor various properties 124, 126, and 128 of storage devices 114, 116, and 118, respectively. In some cases, the properties may be static properties, such as total storage space, device type, interface type, or other characteristics. In some embodiments, the properties may be dynamically updated. Examples of dynamically updated properties may include current error rates, available space, defragmentation parameters, measured throughput or response times, or other properties that may be periodically updated.

The parameters 124, 126, and 128 may be used when applying certain policies. In some cases, a policy engine 120 may select a storage device by ranking or sorting the storage devices based on the properties.

The storage devices 114, 116, and 118 may be any type of storage device. In many instances, the storage devices may be hard disk drives. Some embodiments may manage hard disk drives that have different interfaces. For example, some embodiments may have one or more hard disk drives attached using SCSI, SATA, SAS, IDE, or other industry standard interfaces. Such interfaces may be used when a hard disk drive is mounted internally to a system. Some embodiments may also include hard disk systems that are attached using USB, external SCSI (iSCSI), eSATA, or other interfaces that may be external to a device.

Some embodiments may be capable of managing hard disk drives and other devices that have different interfaces within a single array. For example, a system may have two hard disk drives that use a SATA interface, one hard disk drive that uses an IDE interface, and two additional hard disk drives connected using USB.

The storage devices 124, 126, and 128 may be solid state devices, such as flash memory or other Electronically Erasable Programmable Read Only Memory (EEPROM) devices.

In some cases, the storage devices may include storage systems that have removable media, such as USB flash memory devices, read/write optical media, or other media.

The storage device 114 is shown with a master boot record 130. In some embodiments, a GUID Partition Table (GPT) may be used in place of a master boot record 130. Similarly, storage devices 116 and 118 have a master boot record 136 and 142, respectively. The master boot record may be data that are stored in a specific place in a storage device, typically the first sector of a storage device, and may contain bootstrap commands that may enable a processor to start operation. In many embodiments, a storage device with a master boot record may be used to start up a system.

Some embodiments may not include a master boot record on a storage device, or may include a master boot record that is not bootable by a processor.

When a master boot record is created in a storage array, the master boot record may be different for different types of storage devices. For example, a master boot record for an IDE connected hard disk may enable bootstrap operations for a processor, while a master boot record for a USB connected flash memory device may have a master boot record that is not bootable or may not have a master boot record at all.

Whether a master boot record is present or not, some devices may have a discovery volume 123, 138, and 144. Some devices may not have a discovery volume.

A discovery volume may contain information that may allow an operating system to mount the storage device and access the data stored in the storage device. Some embodiments of the discovery volume may include software that may be executed by a processor to perform the operations of the storage manager 102 that may communicate with a file management system 104 embedded into the operating system 106. The discovery volume may include drivers or other resources that may be used to access the data stored on the storage device.

The discovery volume for different storage devices may be differently configured. Devices using an IDE or SCSI interface may have a differently configured discovery volume that includes drivers configured for the specific interface for the device on which the discovery volume is located. In some embodiments, the discovery volume may be the same between different types of devices and may include drivers, software, or other resources for many different types of devices.

The array metadata 134, 140, and 146 may be the same information copied across each of the storage devices 114, 116, and 118, respectively. The array metadata may contain descriptive information about the configuration of the storage array, along with the physical storage table 112 and the file management table 110. The array metadata may include all information that may be used by a storage manager 102 and file management system 104 to access data on the storage devices. The array metadata may not include the stored data, but may include metadata about the data, such as structure for a hierarchical file system and other metadata.

Any one of the array metadata 134, 140, and 146 may be used to recreate a portion of the storage array if one or more of other devices are not present. Embodiment 400 illustrates one method for doing so.

Policies may be defined so that any array metadata that is stored by the storage manager 102 is copied to each of the storage devices in an array. In some embodiments, the information may be immediately stored on every device. In other embodiments, a background updater 160 may perform the copying operation as a background process.

Different policies may cause data to be stored on different devices or on multiple devices. As an example, Data A may have a policy applied that causes Data A to be stored as block 148 on storage device 114, block 150 on storage device 116, and block 152 on storage device 118. The metadata associated with the data may be used by a policy engine 120 to determine that Data A are to be stored on the three storage devices.

In another example Data B may have a policy applied that causes Data B to be stored on two devices. Data B is illustrated as block 154 on storage device 114 and block 156 on storage device 116. In yet another example Data C may have a policy applied that causes Data C to be stored as block 158 on storage device 116.

Figure 2:
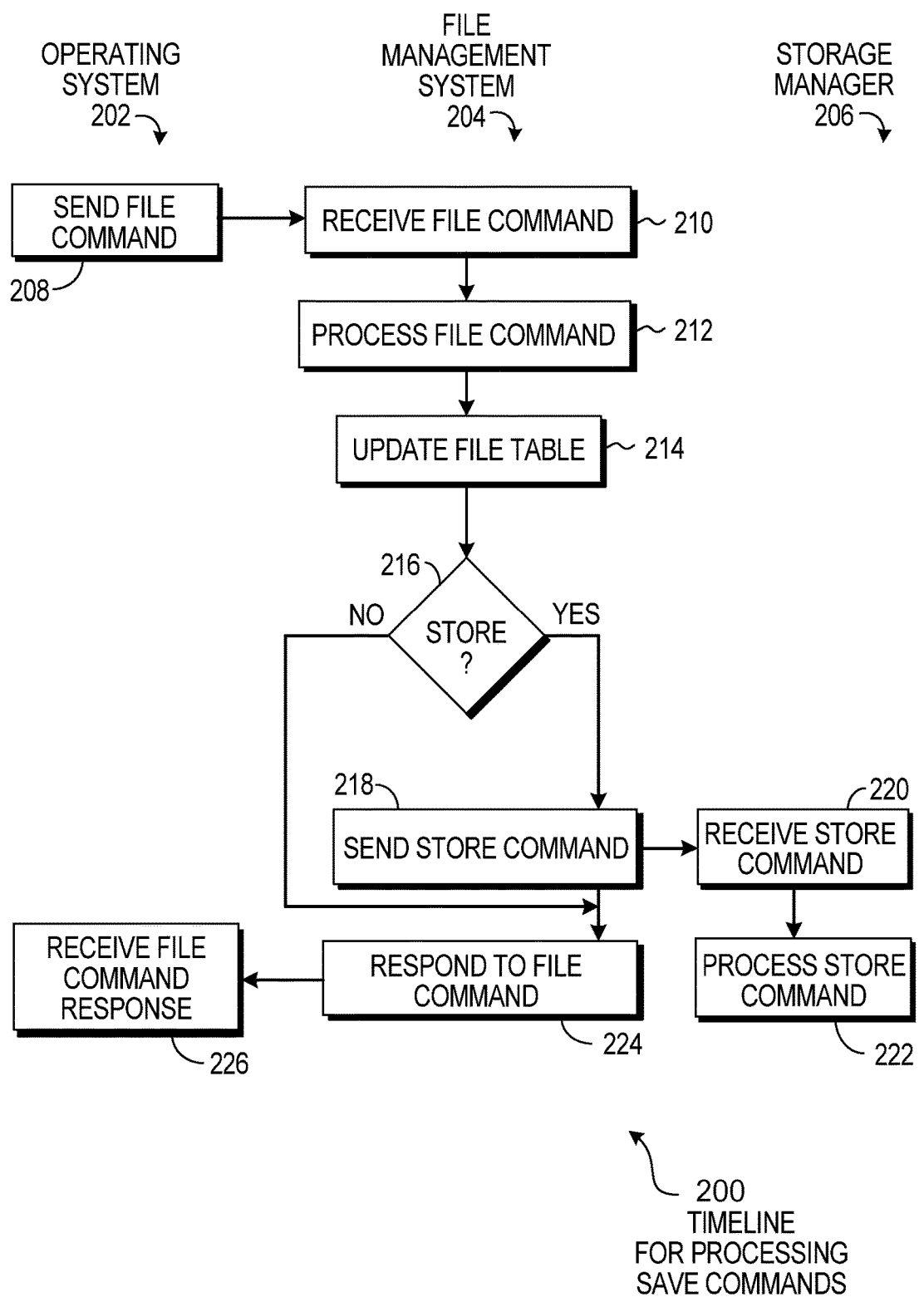
FIG. 2 is a timeline illustration of an embodiment showing a method for processing a save command.

FIG. 2 is a timeline illustration of an embodiment 200 showing the interaction between an operating system 202, a file management system 204, and a storage manager 206. Embodiment 200 is a simplified example of the exchanges that may occur between the separate functional components.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a store command that may be processed by a storage array such as the storage array of embodiment 100.

The operations of an operating system 202 are illustrated in the left hand column. The operations of a file management system 204 are illustrated in the center column, and the operations of the storage manager 206 are illustrated in the right hand column.

The operating system 202 may send a file command in block 208. The operating system 202 may receive a file command from a command line, application, or other mechanism.

The file management system 204 may receive the file command in block 210 and process the file command in block 212, then update the file management table in block 214.

If a store operation is to be performed in block 216, a store command may be sent in block 218 by the file management system 204. The store command may be received in block 220 by the storage manager 206, and the store command may be processed in block 222. Embodiment 300 presented later in this specification illustrates one method for performing the operations of blocks 220 and 222 in more detail.

If the store operation is not to be performed in block 216 or after the store command is sent in block 218, the file management system 204 may respond to the file command in block 224, and the file command response may be received in block 226 by the operating system 202.

In some cases, the file management system 204 may perform some operations without having to access data on a storage device. Such operations may involve just manipulating the file management table. One such operation may be to delete a file. By removing the file reference from the file management table, the file management system 204 may make the storage space free for storing other data in the location. In such a case, the file management system 204 may store the file management table on a storage array managed by the storage manager 206 at some point in the future. For example, after several file deletion operations or after a predefined period of time, the file management system 204 may send a store command in block 218 to store the updated version of the file management table.

Some file commands may perform a store operation. For example, saving a file may cause a store command in block 218 to include data to be stored. Based on the type of data or other metadata associated with the data, a policy may cause the storage manager 206 to store the data in a particular manner on a storage array.

Figure 3:
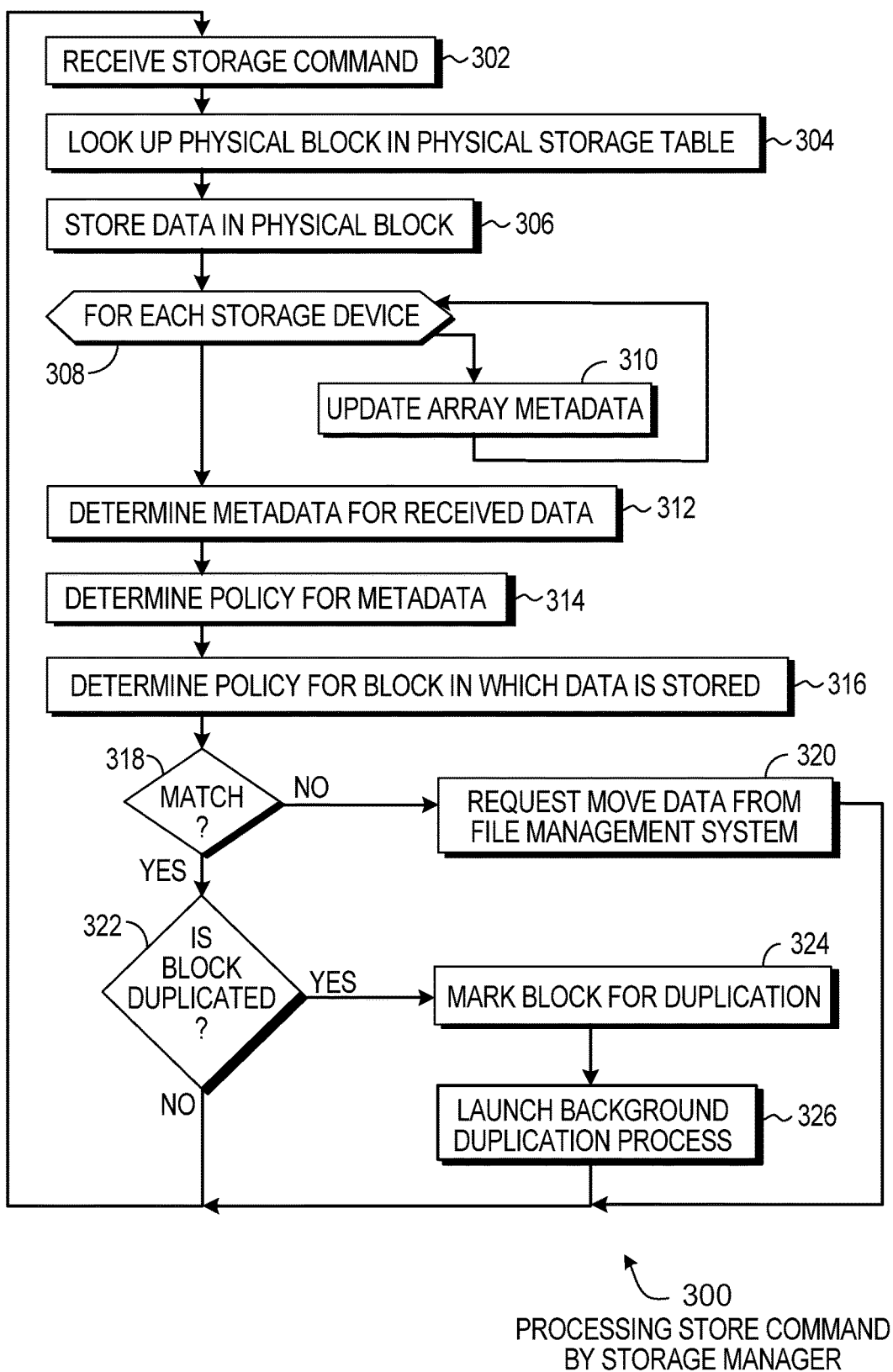
FIG. 3 is a flowchart illustration of an embodiment showing a method for processing a store command by a storage manager.

FIG. 3 is a flowchart illustration of an embodiment 300 showing a method for processing a store command as may be performed by a storage manager, such as storage manager 102 or 202. Embodiment 300 is a simplified example of a method that may be performed when data is sent to a storage manager along with a command to store the data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example process that may be performed by a storage manager. In embodiment 300, data to be written are stored in a block assigned by a file management system. The policy may be applied to the data after the data are stored by a background process. Other embodiments may apply a policy first, then store the data according to the policy. Embodiment 300 illustrates an example of a policy being applied at the time of storage by storing updates to array metadata to all storage devices in a single operation.

Embodiment 300 may receive a storage command in block 302. The storage command may include data that will be stored on a storage array. In embodiment 300, the storage command may include a virtual block identifier in which to store the data.

In many embodiments, a file management system may track the location of data stored in a storage array using a file management table that references a set of virtual addresses. A storage manager may keep a physical storage table, such as the physical storage table 112 in embodiment 100, that may map the logical addresses used by the file management system to physical block addresses within a storage array. In a storage array, a physical block address may include an identifier for a storage device plus an address for the block within the storage device.

In block 304, a storage manager may look up the physical address in the physical storage table.

In block 306, the data to be stored may be stored in the physical block determined in block 304. When changes are made to the storage array, changes may also be made to the array metadata. For example, when the data in block 306 is stored, an update may be made to the physical storage table and the file management table. The updated tables, as well as other array metadata may be changed or modified when a command is processed.

For each storage device in block 308, the array metadata stored on the storage device may be updated in block 310.

In some embodiments, changes to array metadata may be propagated to all the storage devices by a policy. Changes to array metadata may be received from a file management system as data that may or may not include metadata describing the data as array metadata.

After the data are stored in block 306, metadata may be determined for the received data in block 312, and a policy may be determined based on the metadata in block 314.

Embodiment 300 performs the storage operation first, then applies the policy in a second phase. Other embodiments may apply the policy when the data are stored initially. Embodiment 300 may be useful in cases where large amounts of data are to be stored quickly. By getting the data stored initially, the data may be received quickly and any processing and implementing policies may be performed later.

In block 316, a comparison of the policy for the data and the policy applied to the block in which the data is initially stored is performed. If the policies do not match, a request is made to the file management system in block 320 to move the data to another block. The process may return to block 302 and process another storage command.

When a set of data is stored in a block that has a different policy than the data, the storage manager may identify the discrepancy and request that the file management system update the location of the data. The file management system may update the file management table and issue another command to the storage manager in which the data may be moved and the policy applied.

If the policy for the data matches the policy of the block in block 318, and the policy determines that the block is to be duplicated in block 322, the block may be marked for duplication in block 324 and a background process may be launched in block 326 to perform the duplication. If the block is not to be duplicated in block 322, the process returns to block 302 to wait for a new command.

Figure 4:
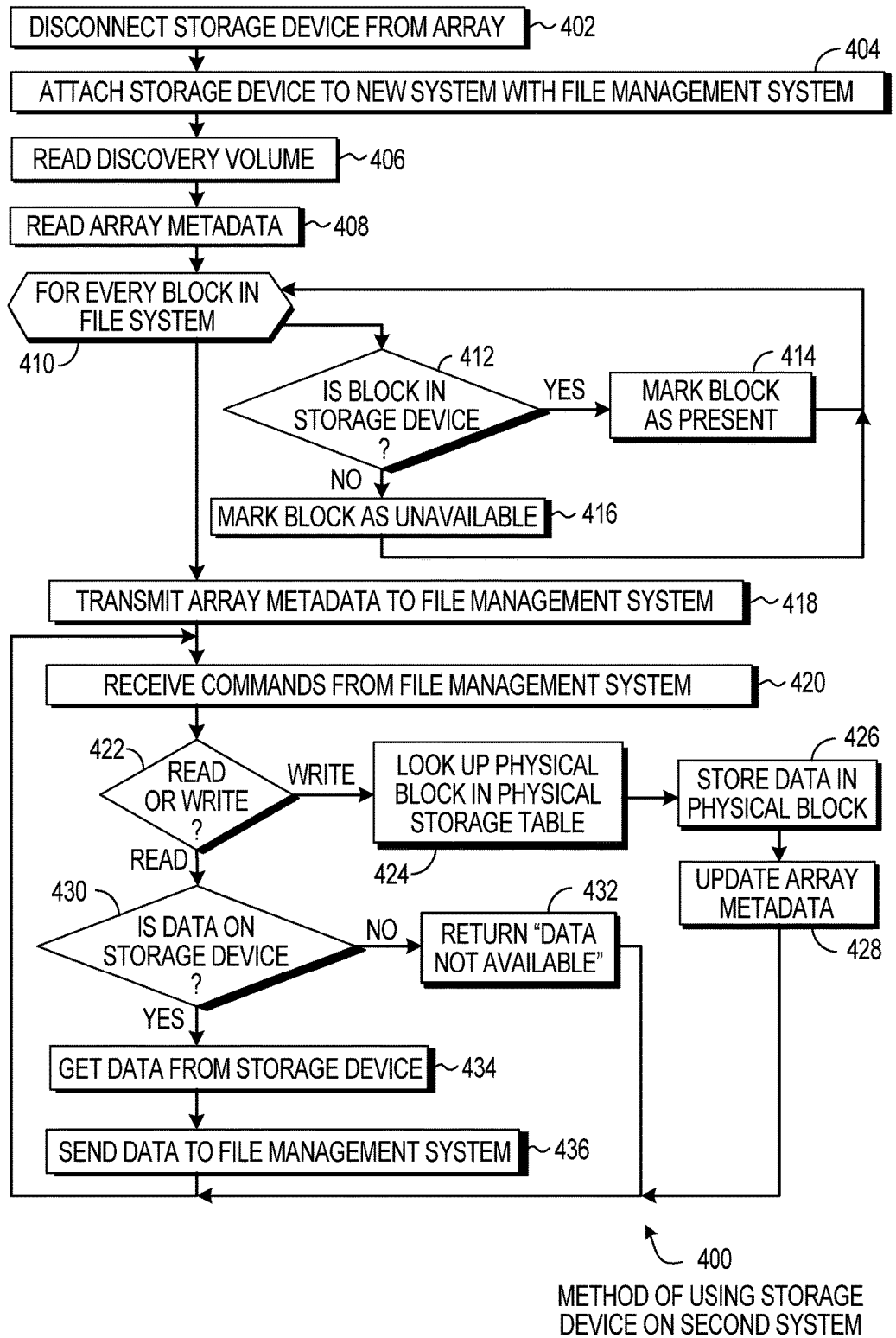
FIG. 4 is a flowchart illustration of an embodiment showing a method for using a storage device on a second system.

FIG. 4 is a flowchart illustration of an embodiment 400 showing a method for using a storage device on a second system. Embodiment 400 is a simplified example of using any device from a storage array that contains the array metadata and accessing the data that are stored on the device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of a use scenario for storage devices that are members of a storage array. When array metadata are stored on a storage device, the array metadata may be used to retrieve data that are stored on the device. In some cases, catastrophic failure of one or more devices in an array may occur, such as due to hardware failure, theft, or some other unforeseen occurrence.

In block 402, a storage device may be disconnected from a storage array. The storage device may be removed from the storage array in block 402 without any warning or preparation, and may be attached to a new system with a file management system in block 404.

In some cases, the new system may have the capability of booting itself, installing an operating system, and beginning operations. In other cases, the new system may attempt to boot from the storage device and may be able to read a master boot record from the storage device.

When the storage device is attached to the new system, the new system may read a discovery volume in block 406. A discovery volume may be a readable volume stored on the storage device that is located in a default location on the storage device and allows interaction with a file management system of the host system.

Within the discovery volume may be drivers, software, or other resources that may be automatically or manually launched and configured so that the file management system may be able to access the storage array.

Once the storage manager functionality is operational on the system, the array metadata may be read in block 408.

In block 410, for every block in the file system stored within the storage array, if the block is stored on the storage device in block 412, the block may be marked as present in block 414. If the block is not on the storage array in block 412, the block may be marked as unavailable in block 416.

The process of blocks 410 through 416 may create metadata about the various blocks of data that are stored on the storage device. In block 418, this metadata and the array metadata may be transmitted to the file management system.

In some embodiments, the file management system may present the presence or absence of data to a user. For example, a directory browser may highlight data that is present and may grey out or otherwise change the appearance of data that is not present.

A command may be received from a file management system in block 420. If the command is a write operation in block 422, the physical block may be looked up in the physical storage table in block 424 and the data may be stored in the physical block in block 426. The array metadata may be updated and stored in block 426 and the process may return to block 420 to perform another command.

The operations of blocks 424 through 428 may be an abbreviated version of embodiment 300, but performed with only one storage device.

If the command is a read command in block 422, and the data is not on the storage device in block 430, a message that the data is unavailable is returned in block 432. The process may return to block 420 to perform another command.

If the command is a read command in block 422 and the data is on the storage device in block 430, the data may be retrieved from the storage device in block 434 and sent to the file management system in block 436.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method for use at a computer system, the computer system connected to a plurality of storage devices, the plurality of storage devices included in a storage array, the storage array defined in accordance with array metadata, the array metadata defining locations for a plurality of files within the storage array, the method for maintaining array metadata for the storage array, the method comprising:

receiving a store command related to a file, the store command derived from a received file command; and processing the store command to store the file and distribute the array meta across different devices in the storage array, including automatically:

storing a portion of the file at each storage device included in a second plurality of storage devices, the second plurality of storage devices including at least two but not all of the storage devices included in the plurality of storage devices such that the portion of the file is not stored at at least one other storage device from among the plurality of storage devices, the portion of the file stored at each storage device included in the second plurality of storage devices stored in accordance with a storage policy and based on file metadata identified for the file;

determining that a file storage location at each storage device included in the second plurality of storage devices has changed due to storing the portion of the file at each storage device included in the second plurality of storage devices;

updating array metadata to reflect the change to the file storage location at each storage device included in the second plurality of storage devices due to storing the portion of the file at each storage device included in the second plurality storage devices;

referring to the storage policy to determine that the updated array metadata is to be duplicated on every storage device included in the second plurality of storage devices and also duplicated to the at least one other storage device; and propagating the updated array metadata to every storage device in the second plurality of storage devices and to the at least one other storage device in accordance with the storage policy, propagating the updated array metadata including propagating a file location for the file to the least one other storage device, the updated array metadata propagated so that every storage device in the plurality of storage devices stores the location of files at every other storage device in the plurality of storage devices.

2. The method of claim 1, further comprising:

receiving the file from a file management system; and identifying the file metadata.

3. The method of claim 2, further comprising referring to the storage policy to determine how to store the portion of the file in the storage array, the storage policy defining how different portions of data, including the portion of the file, are to be stored at a specified number of storage devices from among the plurality of storage devices based on the file metadata for the file; and
  wherein storing the portion of the file at each storage device included in the second plurality of storage devices comprises storing the portion of the file at the specified number of storage devices.

4. The method of claim 3, wherein the specified number is at least three.

5. The method of claim 4, wherein storing the portion of the file at each storage device included in the second plurality of storage devices comprises:
  storing the portion of the file on a first storage device selected from among the plurality of storage devices;
  marking the portion of the file for duplication; and
  copying the portion of the file to the specified number of storage devices.

6. The method of claim 1, further comprising:
  receiving an address for a first storage block in which other received data is to be stored, the first storage block being marked for a second policy;
  storing a portion of the received data in the first storage block;
  determining that the second policy is inconsistent with the storage policy; and
  moving the portion of the received data to a second storage block being marked for the storage policy.

7. The method of claim 6, further comprising:
  sending a request to a file management system; and
  receiving an instruction from the file management system to move the portion of the received data from the first block to the second block.

8. The method of claim 7, wherein sending the request comprises sending an identifier for the second block.

9. The method of claim 1, further comprising:
  receiving additional data from a file management system;
  identifying additional metadata corresponding to the additional data;
  identifying a second policy based on the additional metadata, the second policy defining a set of criteria for storage devices for the additional data;
  identifying a first storage device, from among the plurality of storage devices, on which to store the second set of data; and
  storing the additional data on the first storage device.

10. The method of claim 9, wherein identifying the first storage device comprises ranking the plurality of storage devices using the set of criteria.

11. A computer program product for use at a computer system, the computer system connected to a plurality of storage devices, the plurality of storage devices included in a storage array, the storage array defined in accordance with array metadata, the array metadata defining locations for a plurality of files within the storage array, the computer program product for implementing a method for maintaining array metadata for the storage array, the computer program product comprising one or more memory devices having stored thereon computer-executable instructions that, when executed, cause the computer system to perform the method, including the following:
  receive a store command related to a file, the store command derived from a received file command; and
  process the store command to store the file and distribute the array meta across different devices in the storage array, including automatically:
    store a portion of the file at each storage device included in a second plurality of storage devices, the second plurality of storage devices including at least two but not all of the storage devices included in the plurality of storage devices such that the portion of the file is not stored at at least one other storage device from among the plurality of storage devices, the portion of the file stored at each storage device included in the sub-plurality of storage devices stored in accordance with a storage policy and based on file metadata identified for the file;
  determine that a file storage location at each storage device included in the second plurality of storage devices has changed due to storing the portion of the file at each storage device included in the second plurality of storage devices;
  update array metadata to reflect the change to the file storage location at each storage device included in the second plurality of storage devices due to storing the portion of the file at each storage device included in the second plurality storage devices;
  refer to the storage policy to determine that the updated array metadata is to be duplicated on every storage device included in the second plurality of storage devices and also duplicated to the at least one other storage device; and
  propagate the updated array metadata to every storage device in the second plurality of storage devices and to the at the least one other storage device in accordance with the storage policy, propagating the updated array metadata including propagating a file location for the file to the least one other storage device, the updated array metadata propagated so that every storage device in the plurality of storage devices stores the location of files at every other storage device in the plurality of storage devices.

12. The computer program product of claim 11, further comprising computer-executable instructions that, when executed, cause the computer system to:
  receive a virtual block address for the portion of the file from a file management system; and
  determine a physical block address corresponding to the virtual block address, the physical block address being on a first storage device.

13. The computer program product of claim 12, further comprising computer-executable instructions that, when executed, cause the computer system to determine that the physical block address complies with the storage policy.

14. The computer program product of claim 11, further comprising computer-executable instructions that, when executed, cause the computer system to:
  remove a first storage device from the storage array; and
  while the first storage device is removed from the storage array:
    connect the first storage device to a system having a second file management system;
    receive a request for the array metadata from the second file management system;
    transmit the array metadata from the first storage device to the second file management system;
    receive a request from the second file management system for the portion of the file;
    read the received data from the first storage device; and
    transmit the received data to the second file management system.

15. A system comprising:
  one or more processors;

system memory coupled to the one or more hardware processors, the system memory storing instructions that are executable by the one or more hardware processors;

a storage array comprising a plurality of storage devices, configuration of the storage array defined by array metadata, the array metadata containing data storage locations for a plurality of files stored within the array; and the one or more processors executing the instructions stored in the system memory to maintain array metadata for the storage array, including the following:

receive a store command related to a file, the store command derived from a received file command; and process the store command to store the file and distribute the array meta across different devices in the storage array, including automatically:

store a portion of the file at each storage device included in a second plurality of storage devices, the second plurality of storage devices included at least two but not all of the storage devices included in the plurality of storage devices such that the portion of the file is not stored at at least one other storage device from among the plurality of storage devices, the portion of the file stored at each storage device included in the second plurality of storage devices stored in accordance with a storage policy and based on file metadata identified for the file;

determine that a file storage location at each storage device included in the second plurality of storage devices has changed due to storing the portion of the file at each storage device included in the second plurality of storage devices;

update array metadata to reflect the change to the file storage location at each storage device included in the second plurality of storage devices due to storing the portion of the file at each storage device included in the second plurality of storage devices;

refer to the storage policy to determine that the updated array metadata is to be duplicated on every storage device included in the second plurality of storage devices and also duplicated to the at least one other storage device; and propagate the updated array metadata to every storage device in the second plurality of storage devices and to the at least one other storage device in accordance with the storage policy, propagating the updated array metadata including propagating a file location for the file to the least one other storage device, the updated array metadata propagated so that every storage device in the plurality of storage devices stores the location of files at every other storage device in the plurality of storage devices.

16. The system of claim 15, further comprising the one or more processors executing the instructions stored in the system memory to access the portion of the file.

17. The system of claim 15, further comprising the one or more processors executing the instructions stored in the system memory to synchronize data between storage devices in the background.

18. The system of claim 15, further comprising the one or more processors executing the instructions stored in the system memory to map virtual blocks defined by a file management system to physical blocks of the portion of the file stored at the storage devices included in the second plurality of storage devices.

19. The system of claim 15, wherein each storage device included in the second plurality of storage devices comprises a discovery volume, the discovery volume allowing an operating system to mount the storage device and access the data stored in the storage device.

20. The system of claim 15, wherein the one or more processors executing the instructions stored in the system memory to propagate the updated array metadata comprises the one or more hardware processors executing the instructions stored in the system memory to propagate the updated array metadata in accordance with both static properties and dynamic properties for each storage device included in the second plurality of storage devices, the static properties and dynamic properties used by the storage policy to determine how to propagate the updated array metadata.

* * * * *